United States Patent
Kösslinger

[19]

[11] Patent Number: 6,066,437
[45] Date of Patent: *May 23, 2000

[54] FILM WHICH CAN BE LETTERED USING A LASER BEAM

[75] Inventor: Robert Kösslinger, Munich, Germany

[73] Assignee: Schreiner Etiketten und Selbstklebetechnik GmbH & Co., Oberschleissheim, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/947,261

[22] Filed: Oct. 8, 1997

[30] Foreign Application Priority Data

Oct. 11, 1996 [DE] Germany ............... 196 42 040

[51] Int. Cl.⁷ ............................................. B41M 5/24
[52] U.S. Cl. .................. 430/297; 430/1; 430/2; 430/945; 430/275.1; 283/86; 283/101; 283/105; 283/87; 283/85; 359/2
[58] Field of Search ............... 430/945, 270.15, 430/270.11, 1, 270.12, 2, 275.1, 257; 369/275.5; 283/55–87, 101; 359/105, 2

[56] References Cited

U.S. PATENT DOCUMENTS

| | | | |
|---|---|---|---|
| 3,665,483 | 5/1972 | Becker et al. | 369/275.5 |
| 3,990,084 | 11/1976 | Hamisch et al. | 430/945 |
| 4,335,198 | 6/1982 | Hanada et al. | 430/270.12 |
| 4,394,661 | 7/1983 | Peeters | 430/270.11 |
| 4,847,181 | 7/1989 | Shimokawa | 430/297 |
| 4,856,857 | 8/1989 | Takeuchi et al. | 283/86 |
| 5,102,497 | 4/1992 | Hamaguchi et al. | 156/656 |
| 5,267,755 | 12/1993 | Yamauchi et al. | 283/86 |
| 5,298,922 | 3/1994 | Merkle et al. | 283/85 |
| 5,310,222 | 5/1994 | Chatwin et al. | 359/2 |

FOREIGN PATENT DOCUMENTS

| | | | |
|---|---|---|---|
| 2046711 | 1/1992 | Canada | 430/1 |
| 0645747A2 | 9/1994 | European Pat. Off. . | |
| 0684145A1 | 5/1995 | European Pat. Off. . | |
| 41 34 271C1 | 10/1989 | Germany . | |
| 4131964 | 4/1993 | Germany . | |
| 195 41 453A1 | 11/1995 | Germany . | |
| 57-74842 | 5/1982 | Japan | 369/275.5 |
| 57-200077 | 12/1982 | Japan | 430/2 |
| 61-238079 | 10/1986 | Japan | 430/1 |
| 62-17783 | 1/1987 | Japan | 430/2 |
| 62-17784 | 1/1987 | Japan | 430/2 |
| 63-230389 | 9/1988 | Japan . | |
| 2-247832 | 10/1990 | Japan | 369/275.5 |
| 3-076688 | 4/1991 | Japan . | |
| 5-11677 | 1/1993 | Japan | 430/1 |
| 8902604 | 10/1989 | Netherlands . | |
| 2240948 | 8/1991 | United Kingdom | 283/86 |
| 88/01403 | 2/1988 | WIPO | 430/2 |

*Primary Examiner*—Martin Angebranndt
*Attorney, Agent, or Firm*—Nixon Peabody LLP; Donald R. Studebaker

[57] ABSTRACT

This invention relates to film which is lettered with a laser beam comprising at least one protective film which is transparent to the laser beam, at least one opaque layer which is ablated by the laser beam, and at least one contrast-forming layer on its bottom. The abatable layer is preferably a metallic layer and can have a color like the contrast-forming layer. The color of the metallic layer is different from the color of the contrast-forming layer. The contrast-forming layer is either applied, imprinted or varnished onto the metallic layer. The contrast-forming layer can be at least one plastic film. On a side of the contrast-forming layer facing away from the metallic layer there is an adhesive layer which is covered with a carrier material, for example, an adhesive-repellant carrier film.

47 Claims, 3 Drawing Sheets

FILM WHICH CAN BE LETTERED USING A LASER BEAM

FIELD OF THE INVENTION

The present invention relates to a film which is lettered with a laser beam. The film comprises at least one protective film which is transparent to the laser beam, with a medium which is altered by the laser beam located on the bottom.

Lettering is defined hereinafter as graphic symbols and characters of any type.

DESCRIPTION OF THE PRIOR ART

A film of this type is known from European Patent Application EP 0 688 678 A1. As disclosed in the European Patent application, a film comprising a medium which is altered consists of a plastic carrier layer where an additive changes optically under laser radiation, for example, copper hydroxide phosphate, is used. Production of this plastic carrier layer is complex and the possibilities of coloring the lettering are limited. In addition, the definition of the lettering produced is not completely satisfactory.

In European Patent application EP 0 645 747 A2, a label material is disclosed which is lettered by using a laser and comprises a first layer and a second layer wherein the second layer differs optically from the first layer. The two layers are applied to two sides of a transparent carrier layer. The first layer is removed directly by laser radiation according to a desired lettering or printed image in which the surface of the second layer becomes visible.

In this label material, the colors of the characters or images and the background color are optional, after the lettering process; however, the lettering is unprotected and can be easily damaged. To protect the lettering, for example, after the lettering process, a transparent protective film is cemented over the label material. However, it has been shown that application of this protective film, especially in the series production of articles, is an extremely tedious and time-consuming step which is generally done by hand and therefore greatly disrupts the production process.

SUMMARY OF THE INVENTION

Proceeding from the aforementioned disadvantages and deficiencies of films known in the prior art, a primary object of the present invention is to make available a film of the initially mentioned type which is lettered with a laser beam and is produced quickly and cost-effectively, i.e., by few lamination steps, and is further easily processed with high product quality.

Furthermore, an object of the present invention is to provide a film which results in essentially no unhealthy or polluting emissions when lettered with a laser beam.

In addition, an object of the present invention is to provide a film which can be inscribed with a laser beam and which the lettered image is protected against chemical and mechanical attacks.

Finally, an object of the present invention is to provide a film which offers flexible and diverse application possibilities to the final consumer in spite of a simple structure.

The above-noted objects of the present invention as well as others are achieved by providing a film of the initially mentioned type comprising a medium which is changed by a laser beam having at least one opaque layer ablated by the laser beam and at least one contrast-forming layer.

"Ablated" is defined here as a layer which is destroyed or removed by the action of the laser beam so that it loses its opacity.

According to the present invention, a film, lettered with a laser beam is made available and is produced quickly and cost-favorably, i.e., by few lamination steps, and is further easily processed with high product quality. The final consumer is being offered flexible and diverse application possibilities in spite of a simple structure. The final consumer can, for example, order the film as claimed in the present invention as raw material to some extent as meter goods, and can further process it into labels as required by lettering it with a laser, cutting it to the desired size, and possibly providing it with an adhesive layer. But it is also conceivable to prepare the film for the purposes of the final consumer on the producer side, such as providing it with a self-adhesive layer if required and/or punching it out in a desired size and/or providing it with letters to which additions can be made by the final consumer, for example, by addition of a serial number. In any case, the lettering is protected by the protective film and the final consumer does not need to be concerned with the time-consuming process of applying or laminating the protective film.

Since the opaque layer ablated by the laser beam is enclosed between the protective film and the contrast-forming layer, the label when lettered with the laser beam emits almost no unhealthy and polluting emissions, further, the label offers major immanent protection of the lettered image against chemical and mechanical attacks.

The abatable layer is preferably a largely metallic layer since this material is preferred for working with a laser beam. With the choice of metal or metal alloy, a certain color can be imparted to the layer.

According to one preferred embodiment of the present invention, the metallic layer is a metal coating which has been vapor-deposited on the protective film, the metallic layer optionally containing at least one hologram. Alternatively or in addition, the metallic layer can also be colored. It has been found that the lettering in this film becomes especially high-definition. In particular, aluminum has proven to be as effective as the selected metal. The metal can be vapor-deposited or sputtered on a substrate.

According to one especially inventive development of this film, the contrast-forming layer which is largely resistant to laser radiation has a color, which preferably different from the coloring of the metallic layer. For the end consumer, this leads to high flexibility with respect to the color choice. The contrast-forming layer can have areas of different color to allow lettering to be produced in the corresponding colors.

According to a preferred embodiment of the present invention, the abatable layer has a thickness of approximately 3 microns and is especially suitable in this way for efficient ablation with the laser beam.

According to one advantageous embodiment, the layer has a thickness of 0.1 microns to 0.4 microns, such as a quarter of the wavelength of one component of the visible light, and thus produces a color effect which changes sensitively when treated with a laser beam by interference action.

Advantageously, the contrast forming layer is applied to the metallic layer, whether by imprinting or varnishing.

According to one advantageous embodiment of the present invention, the contrast-forming layer has several areas of different color so that multicolored lettering of the film is easily produced.

According to one suitable embodiment of the film as claimed in the present invention, the contrast-forming layer is at least one film which preferably has a color and/or which conventionally consists of plastic, preferably polyethylene (PE), polyethylene terephthalate (PET) or polyvinyl chloride (PVC).

Furthermore, it is also possible for the contrast-forming layer to include at least one adhesive layer which is largely resistant to laser radiation and which has preferably one color.

Alternatively, on the side of the contrast-forming layer facing away from the metallic layer, there is at least one adhesive layer in place. It has preferably a color and/or is feasibly covered with a carrier material, preferably an adhesive-repellant carrier film.

According to one preferred embodiment of this label, the protective film, which is transparent to the laser beam has a medium on its bottom which is altered by the laser beam, is transparent film consists of plastic, preferably polyester, acrylate, polyethylene (PE), polyethylene terephthalate (PET), polypropylene (PP) or polyvinyl chloride (PVC), polyester being especially well suited.

According to another embodiment of the present invention, there is a cover section on the protective film which protects the protective film against dirt during the production process which can be removed afterwards.

The present invention is described below in detail using schematically shown embodiments. To illustrate the structure of film as claimed in the present invention, the dimensions of the individual components of the film are not shown true-to-scale.

DETAILED DESCRIPTION

Figure 1:
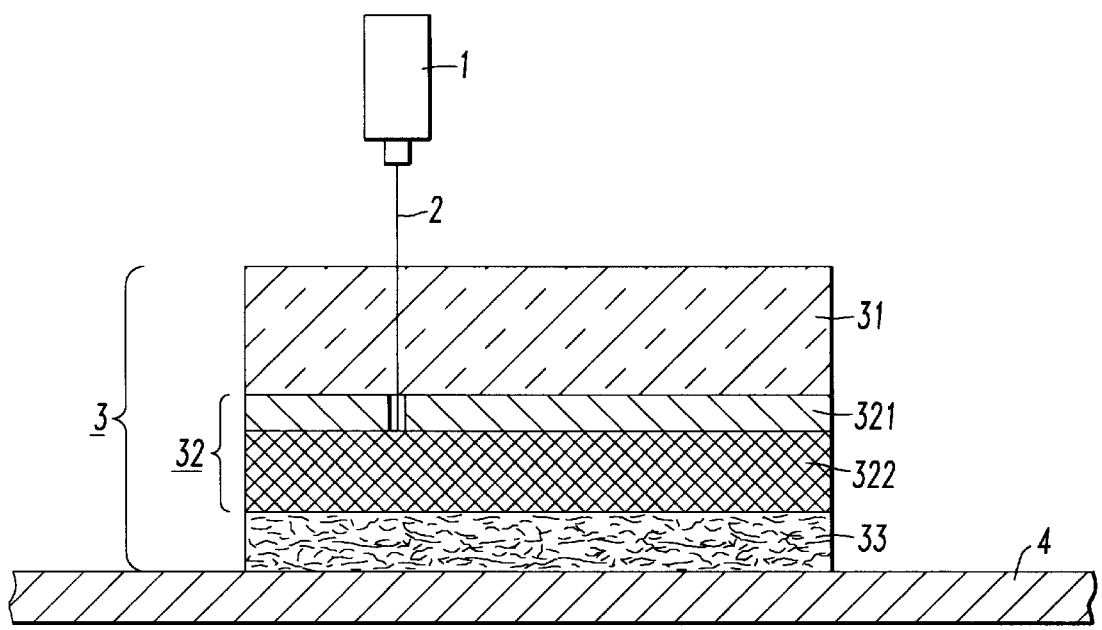
FIG. 1 is a first embodiment of a film which is lettered using a laser beam in accordance with the present invention.

FIG. 1 shows that laser 1, for example, a carbon dioxide laser or neodymium-YAG laser, which emits a laser beam 2 which passes through a transparent protective film 31 which is permeable to laser beam 2. The protective film 31 was comprise any one ore more of acrylate, polyethylene (PE), polyethylene terephthalate (PET), polypropylene (PP) or polyvinyl chloride (PVC), preferably polyester. The protective film 31 preferably has a thickness of approximately 25 microns.

On the bottom of the protective film 31, such as on the side of the protective film facing away from the laser, there is medium 32 which is altered by the laser beam 2 comprising a metallic layer 321, for example a metal coating which has been vapor-deposited on the protective film 31, and a contrast-forming layer 322. The metallic layer 321 is preferably an aluminum layer which has been vapor deposited on the protective film 31 with a thickness (preferably approximately 3 microns) such that it is opaque and thus blocks the view of the contrast-forming layer 322. The contrast-forming layer 322 is preferably a layer of printing ink, preferably flexographic printing ink, which has been imprinted onto the metallic layer 321 with a preferred application weight of 6 g/m². Contrast-forming layer 322 seals the metallic layer 321, such as enclosed between the protective film 31 and the contrast-forming layer 322 so that no harmful emission can emerge to the outside during laser treatment.

Alternatively to vapor deposition of the metallic layer 321, it is also possible to apply the metallic layer by sputtering.

The action of the laser beam causes ablation of the metallic layer 321, such that it disappears at the sites where laser beam 2 acts on them. For an observer, this results in clearly recognizable high-definition lettering of the film 3 at the sites where metallic layer 321 is vaporized by the action of the laser beam 2 and thus the contrast-forming layer 322 becomes partially visible. Extremely fine metal droplets which precipitate after vaporization of the metallic layer are essentially invisible and in no way disrupt the lettered image. It is decisive that the structure of the layer is destroyed.

It should be noted that when the metallic layer 321 is made thin enough, the action of the laser beam 2 is kept very brief so that neither the protective film 31 nor the contrast-forming layer 322 are adversely affected in any way. In particular, material which is significantly removed by aerosol formation can be reliably prevented in this way, so that in the lettering process with the laser beam 2 both the protective film 31 and the contrast-forming layer 322 are involved only to a minor degree at most.

At the end consumer, when the metallic layer 321 and/or the contrast-forming layer 322 is colored, this can lead to high flexibility with respect to color selection when the color of the contrast-forming layer 322 is different from the color of the metallic layer 321. The contrast-forming layer 322 is in fact a colored film which conventionally consists of plastic, preferably polyethylene (PE), polyethylene terephthalate (PET) or polyvinyl chloride (PVC).

On the side of the contrast-forming layer 322 facing away from the metallic layer 321, as shown in FIG. 1, there is an adhesive layer 33 which is covered with an adhesive-repelling carrier film 4.

Film 3 which is lettered with the laser beam 2, which is shown in FIG. 1, is produced quickly and cost-favorably, such as by few lamination steps, and is further processed with high product quality. The end consumer enjoys flexible and diverse application possibilities in spite of the simple structure of the film 3.

In particular, it should be emphasized that when the film 3 is lettered with laser beam 2, essentially no unhealthy or polluting emissions are caused in that the area in which the engraving takes place is sealed by the protective film. Film 3 offers high immanent protection of the engraved lettered image to chemical and mechanical attacks.

Figure 2:
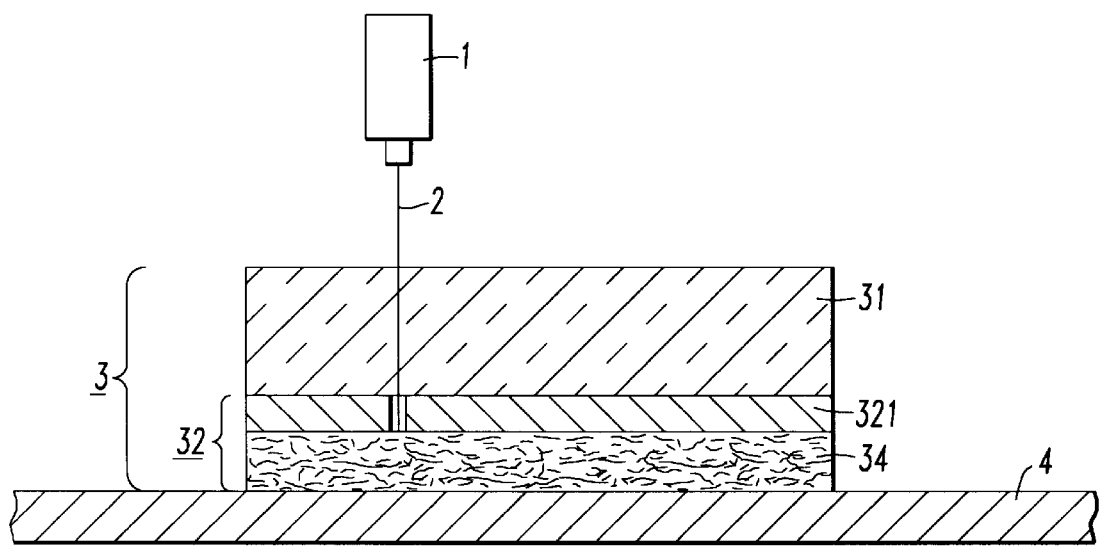
FIG. 2 is a second embodiment of a film which is lettered using a laser beam in accordance with the present invention.

As shown in FIG. 2, the film 3 in accordance with an alternative embodiment of the present invention is lettered with the laser beam and is structured similarly to the film as shown in FIG. 1. An inked adhesive layer 34, which is resistant to laser radiation, operates as the contrast-forming layer. Contrast-forming layer 322, as shown in FIG. 1, and the adhesive layer are to a certain extent combined into a single layer, specifically, adhesive layer 34, as shown in FIG. 2.

Figure 3:
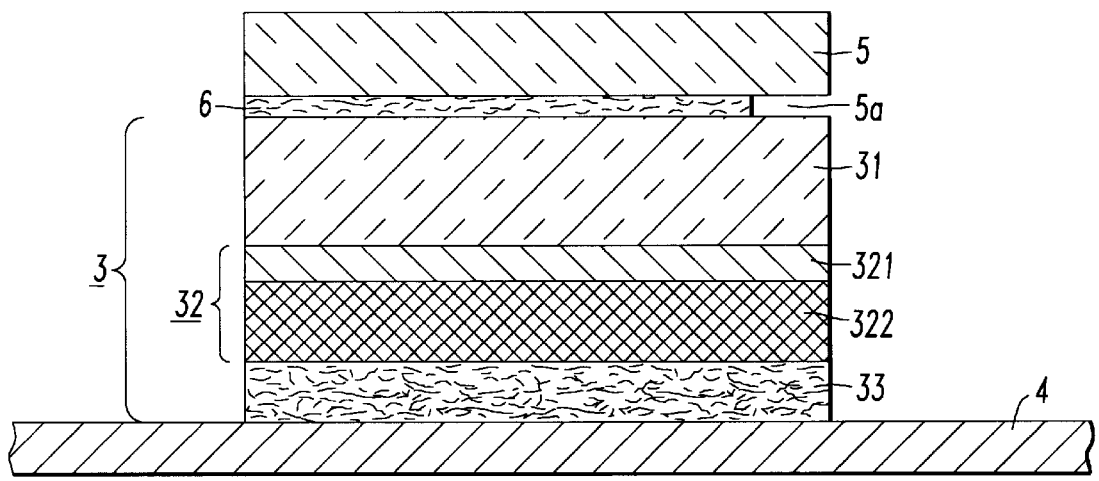
FIG. 3 is a third embodiment of a film which is lettered using a laser beam in accordance with the present invention.

FIG. 3 shows another embodiment of the film as in accordance with the present invention. The embodiment of FIG. 3 differs from the embodiment of FIG. 1 in that a cover section 5, which is transparent to laser radiation, is attached to the protective film 31. A layer 6 of detachable transparent adhesive is used to attach the cover section 5. An edge area 5a of the cover section 5 is free of the adhesive. This adhesive-free edge area 5a is used as a removal aid when the cover section 5 is removed.

A label punched out of the film in accordance with the present invention, as shown in FIG. 3, is attached to an article, for example, a motor housing, by means of an adhesive layer 33 within the framework of an automated production process. During the production process, it can be lettered with the laser in the above described manner, the laser beam traversing not only the protective film 31, but also cover section 5 and the adhesive layer 6, largely without effect. After varnishing of the article, the cover section 5 together with the color layer (not shown) which has precipitated on it during the varnishing process is removed, for which it is gripped on adhesive-free edge area 5a. Other known types of cover sections can of course likewise be provided.

The cover layer can also be provided with imprints (not visible in the drawing) which can include for example operating instructions. In particular, it is important that the spectral absorption range of the material comprising the imprint does not have the same frequency as the laser beam, in order to keep absorption of the laser beam as low as possible.

Figure 4:
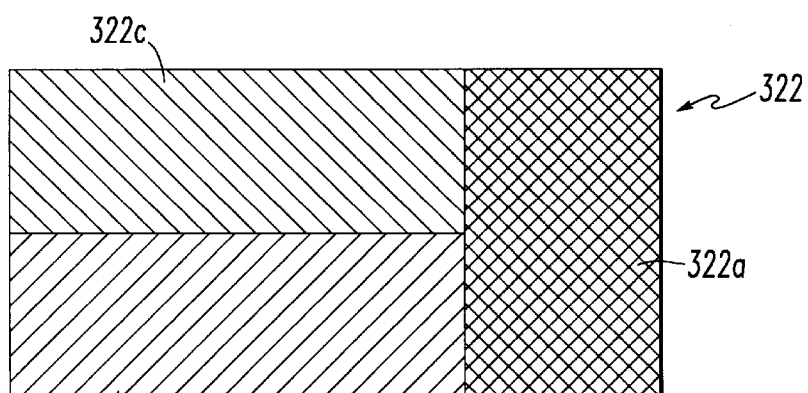
FIG. 4 illustrates an overhead view of a layer of the film of the third embodiment of FIG. 3.
Figure 5:
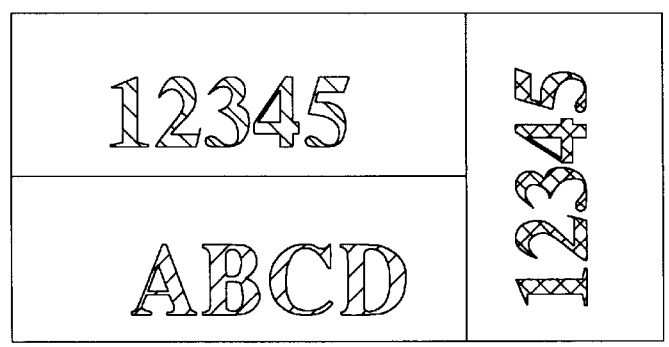
FIG. 5 illustrates an overhead view of a lettered film.

FIG. 4 shows the contrast-forming layer 322 of the label shown in FIG. 3. The contrast-forming layer 332 which has been applied by printing, has several areas 332a, 332b, 332c of different color. Specifically, letters can be produced in different colors. As shown in FIG. 5, an overhead view of the lettered label is provided with three characters with colors corresponding to the colors of areas 332a, 332b, and 332c, as illustrated by the choice of like cross-hatching in FIGS. 4 and 5. As a result, a very attractive label which is lettered in different colors with a laser is formed.

Figure 6:
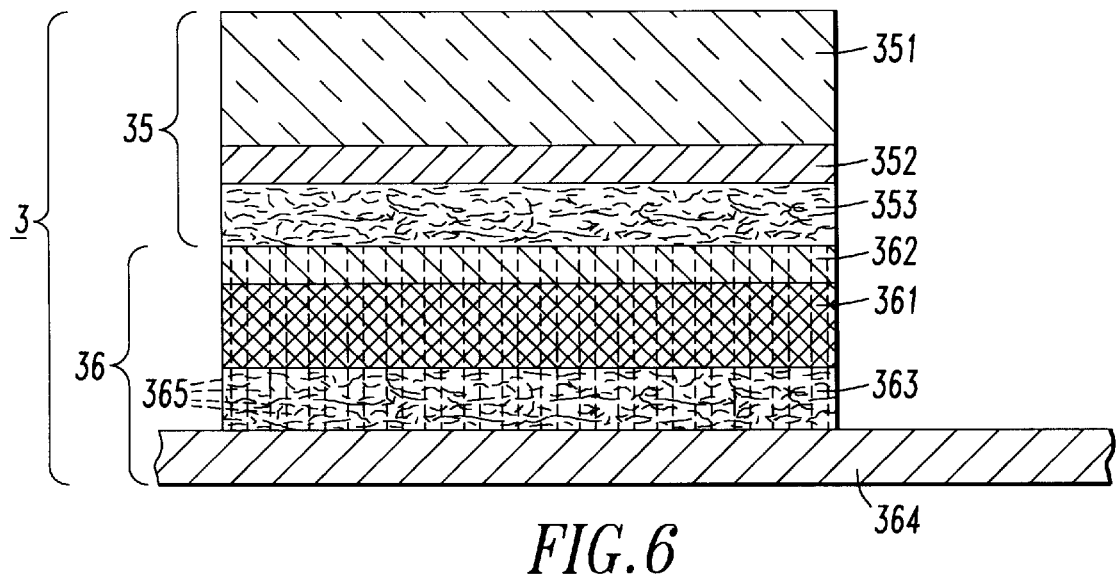
FIG. 6 is a fourth embodiment of a film which is lettered using a laser beam in accordance with the present invention.

Another embodiment of the film set forth in accordance with the present invention is shown in FIG. 6. FIG. 6 shows that film 3 consists of two partial films 35 and 36 laminated together. The first partial film 35 has a transparent layer 351 of polyethylene terephthalate (PET) which is vapor-coated with metallic aluminum on one side (as shown in FIG. 6 on the "bottom" side) so that an aluminum layer 352 is formed. The vapor-deposited aluminum layer 352 has a thickness such that it is opaque, such that light in the visible range cannot penetrate this layer. The vapor-deposited aluminum layer 352 is covered with a layer of transparent adhesive 353.

The second partial film 36 has a layer of white polyethylene terephthalate (PET) 361 which is printed with a layer of flexographic printing inks 362. The print, as shown in the embodiment of FIG. 4, can have areas of different colors.

The second surface of white PET film 361 is coated with adhesive 363. With this layer of adhesive 363 the film combination adheres to carrier film 364 which has a smooth adhesive-repellant layer so that separation between the layer of adhesive 363 and carrier film 364 is possible without effort.

To produce the label as shown in FIG. 6, the partial films 35 and 36 are laminated together, then the labels are punched out. Punching takes place such that the carrier film 364 is not punched out.

The embodiment of FIG. 6 is characterized by an especially simple, cost-favorable production, since the second partial film 36 represents a commercial film and the first partial film 35 is produced without great cost.

The contrast-forming layer in this embodiment consists of white PET-layer 361 in conjunction with the layer of flexographic printing inks 362.

The embodiment of FIG. 6 is different from the above described embodiments essentially by the interposition of the adhesive layer 353 which has proven especially advantageous with respect to production technology. Once the partial film 35 is produced, it is easily combined with the second partial film 36, for example for selection of a corresponding background color.

Figure 7:
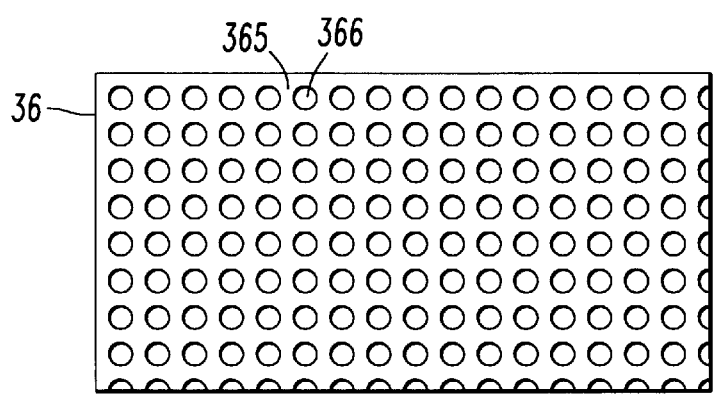
FIG. 7 illustrates an overhead view of a partial film of the fourth embodiment of FIG. 6.

In addition, the embodiment of FIG. 6 is suitable especially for attaching anti-tampering punchouts 365. As shown in FIG. 6, the partial film 36 is divided by the anti-tampering punchouts 365 into different segments. An overhead view of the partial film 36 is shown in FIG. 7. The shape of anti-tampering punchouts 365 is chosen such that there are numerous circular segments 366 in the overhead view in FIG. 7. In an attempt to detach the film 3, which is adhered to an adhesive layer 363 after being removed from an carrier layer 364, from an undersurface, the partial film 36 will be divided. Circular segments 366 of the partial film will remain adhered to the undersurface, while the other parts of the partial film 36 is pulled off of the undersurface. The film 3 is irretrievably damaged and can no longer be attached to another article without damage becoming conspicuous. Therefore, product counterfeiting can be effectively prevented.

Of course, instead of an anti-tampering punchout with the circular pattern shown, anti-tampering punchouts with any other pattern can be used. Furthermore, symbols, letters and characters can be used for this purpose.

As shown in FIG. 6, if the anti-tampering punchouts 365 are also extended through the layer of flexographic printing inks 362, the anti-tampering punchouts 365 are easily felt and a slight unevenness on the transparent layer 351 is seen. This is desirable in many applications, for example, if the anti-tampering punchouts 365 are provided in the form of a company logo.

On the other hand, if the anti-tampering punchouts according to one embodiment (not shown) extend only through the film 361 and the adhesive layer 363, but not through the color layer 362, the slight unevenness caused by the anti-tampering punchouts is equalized by the color layer 362, so that the anti-tampering punchouts are not seen or felt to the outside. In this case, when a counterfeiter tries to remove the label and attaches the label to other articles, the counterfeiter will be surprised and unmasked by the presence of the anti-tampering punchouts 365 since the label is conspicuously damaged by the removal process.

Product counterfeiters are also often trying to remove labels using heat, since heat reduces the adhesive strength of adhesives. In the case of the label shown in FIG. 6, the film provided with the anti-tampering punchouts 365 is also ripped open when heat is being used, since the heat influences both the adhesive layer 363 and the adhesive layer 353. As a result, the circular segments 366 which have been punched out in FIG. 7 are separated more easily from the layer 35. Therefore, in spite of the weakening of the adhesive strength of the adhesive layer 363, the circular segments 366 remain on the article on which the label has been attached and cause the intended damage to the label.

While the present invention has been described with reference to the preferred embodiment, it will be appreciated by those skilled in the art that the invention may be practiced otherwise than as specifically described herein without departing from the spirit and scope of the invention. It is, therefore, to be understood that the spirit and scope of the invention be limited only by the appended claims.

What is claimed is:

1. A film to be lettered with a laser beam comprising:
   at least one protective film which is transparent to said laser beam;
   at least one substantially metallic opaque layer having at least one first color and being applied onto a bottom surface of said at least one protective film, said substantially metallic opaque layer being selectively ablated by said laser beam in areas where the metallic layer is irradiated by said laser beam, said at least one protective film sealing said substantially metallic opaque layer before, during, and after ablation of said substantially metallic opaque layer;
   at least one contrast-forming layer applied to said at least one substantially metallic opaque layer, said contrast-forming layer having at least one color which is contrasting to said first color and being substantially resistant to said laser beam, and
   an adhesive layer applied to said at least one contrast-forming layer.

2. The film as claimed in claim 1, wherein said at least one substantially metallic opaque layer contains a metal alloy.

3. The film as claimed in claim 1, wherein said substantially metallic opaque layer is an aluminum layer.

4. The film as claimed in claim 1, wherein said at least one substantially metallic opaque layer has a thickness from 0.1 microns to 0.4 microns.

5. The film as claimed in claim 1, wherein said at least one contrast-forming layer is imprinted to said at least one substantially metallic opaque layer.

6. The film as claimed in claim 1, wherein said at least one contrast-forming layer is varnished to said at least one substantially metallic opaque layer.

7. The film as claimed in claim 1, wherein said at least one substantially metallic layer is vapor-deposited onto said at least one protective layer film.

8. The film as claimed in claim 1, wherein said at least one substantially metallic opaque layer is sputtered onto said at least one protective film.

9. The film as claimed in claim 1, further comprising at least one cover section transparent to said laser beam attached to said at least one protective film with a removable adhesive.

10. The film as claimed in claim 9, further comprising at least one imprint transparent to said laser beam positioned on said least one cover section.

11. The film as claimed in claim 9, wherein said at least one cover section includes an adhesive-free edge.

12. A film lettered with a laser beam comprising:
    at least one protective film which is transparent to said laser beam;
    at least one substantially metallic opaque layer having a first color and being applied onto a bottom surface of said at least one protective film, said substantially metallic opaque layer being selectively ablated by said laser beam in areas where the metallic layer is irradiated by said laser beam, said at least one protective film sealing said substantially metallic opaque layer before, during, and after ablation of said substantially metallic opaque layer;
    at least one hologram contained in said substantially metallic opaque layer;
    at least one contrast-forming layer applied to said at least one substantially metallic opaque layer, said contrast-forming layer having at least one color which is contrasting to said first color and being substantially resistant to said laser beam; and
    an adhesive layer applied to said at least one contrast-forming layer.

13. The film as claimed in claim 12, further comprising at least one cover section transparent to said laser beam attached to said at least one protective film with a removable adhesive.

14. The film as claimed in claim 13, wherein said at least one cover section includes an adhesive-free edge.

15. A film lettered with a laser beam comprising:
    at least one protective film which is transparent to said laser beam;
    at least one substantially metallic opaque layer having at least one first color and being applied onto a bottom surface of said at least one protective film, said substantially metallic opaque layer being selectively ablated by said laser beam in areas where the metallic layer is irradiated by said laser beam, said at least one protective film sealing said substantially metallic opaque layer, before during and after ablation of said substantially metallic opaque layer; and
    at least one contrast-forming layer applied to said at least one substantially metallic opaque layer, said contrast-forming layer having several areas of different color which are contrasting to said first color and being substantially resistant to said laser beam.

16. The film as claimed in claim 15, further comprising at least one cover section transparent to said laser beam attached to said at least one protective film with a removable adhesive.

17. The film as claimed in claim 16, wherein said at least one cover section includes an adhesive-free edge.

18. A film lettered with a laser beam comprising:
    at least one protective film which is transparent to said laser beam;
    at least one substantially metallic opaque layer having a first color and being applied onto a bottom surface of said at least one protective film, said substantially metallic opaque layer being selectively ablated by said laser beam in areas where the metallic layer is irradiated by said laser beam, said at least one protective film sealing said substantially metallic opaque layer before, during, and after ablation of said substantially metallic opaque layer; and
    an adhesive layer applied to said at least one substantially metallic opaque layer, said adhesive layer having a second color which is contrasting to said first color and being substantially resistant to said laser beam.

19. The film as claimed in claim 18, wherein said at least one substantially metallic opaque layer contains a metal alloy.

20. The film as claimed in claim 18, wherein said substantially metallic opaque layer is an aluminum layer.

21. The film as claimed in claim 18, wherein said at least one substantially metallic opaque layer has a thickness from 0.1 microns to 0.4 microns.

22. The film as claimed in claim 18, further comprising at least one cover section transparent to said laser beam attached to said at least one protective film with a removable adhesive.

23. The film as claimed in claim 22, wherein said at least one cover section includes an adhesive-free edge.

24. A film lettered with a laser beam comprising:
    at least one protective film which is transparent to said laser beam;
    at least one substantially metallic opaque layer having a first color, and being applied onto a bottom surface of said at least one protective film, said substantially metallic opaque layer being selectively ablated by said laser beam in areas where the metallic layer is irradiated by said laser beam, said at least one protective film sealing said substantially metallic opaque layer before, during, and after ablation thereof, and an adhesive layer applied to said at least one substantially metallic opaque layer, said adhesive layer having areas of different colors which are contrasting to said first color and being substantially resistant to said laser beam.

25. The film as claimed in claim 24, further comprising at least one cover section transparent to said laser beam attached to said at least one protective film with a removable adhesive.

26. The film as claimed in claim 25, wherein said at least one cover section includes an adhesive-free edge.

27. A film lettered with a laser beam comprising:
at least one protective film which is transparent to said laser beam;
at least one substantially metallic opaque layer having at least one first color, and being applied onto a bottom surface of said at least one protective film, said substantially metallic opaque layer being selectively ablated by said laser beam in areas where the metallic opaque layer is irradiated by said laser beam, said at least one protective film sealing said substantially metallic opaque layer before, during, and after ablation of said substantially metallic opaque layer; at least one hologram contained within said at least one substantially metallic opaque layer; and
an adhesive layer applied to said at least one substantially metallic opaque layer, said adhesive layer having a second color which is contrasting to said first color and being substantially resistant to said laser beam.

28. The film as claimed in claim 27, further comprising at least one cover section transparent to said laser beam attached to said at least one protective film with a removable adhesive.

29. The film as claimed in claim 28, wherein said at least one cover section includes an adhesive-free edge.

30. A film lettered with a laser beam comprising:
a first partial film, said first partial film including at least one protective film which is transparent to said laser beam, at least one substantially metallic opaque layer applied onto a bottom surface of said at least one protective film and having a first color, said substantially metallic opaque layer being selectively ablated by said laser beam in areas where the metallic layer is irradiated by said laser beam, said at least one protective film sealing said substantially metallic opaque layer before, during, and after ablation of said substantially metallic opaque layer, and a first adhesive layer applied to said at least one substantially metallic opaque layer and being resistant to laser radiation;
a second partial film applied to said first partial film, said second partial film including at least one contrast-forming layer having at least one color which is contrasting to said first color of said substantially metallic opaque layer of said first partial film; and a second adhesive layer applied to said at least one contrast-forming layer on a side of said at least one contrast-forming layer facing away from said at least one substantially metallic opaque layer; and
wherein said first partial film and said second partial film are joined together by means of said first adhesive layer.

31. The film as claimed in claim 30, wherein said at least one contrast-forming layer consists of plastic.

32. The film as claimed in claim 31, wherein said plastic is chosen from a group consisting of polyethylene (PE), polyethylene terephthalate (PET), polyvinyl chloride (PVC).

33. The film as claimed in claim 30, wherein said at least one contrast-forming layer is coated with ink.

34. The film as claimed in claim 30, wherein said second adhesive layer is covered with an adhesive-repellant carrier material.

35. The film as claimed in claim 30, wherein said at least one protective film consists of plastic.

36. The film as claimed in claim 35, wherein said plastic is chosen from a group consisting of polyester, acrylate, polyethylene (PE), polyethylene terephthalate (PET), polypropylene (PP), polyvinyl chloride (PVC).

37. The film as claimed in claim 30, wherein said film is punched or cut out in label form.

38. The film as claimed in claim 30, further comprising at least one cover section transparent to said laser beam attached to said at least one protective film with a removable adhesive.

39. The film as claimed in claim 38, further comprising at least one imprint transparent to said laser beam on said at least one cover section.

40. The film as claimed in claim 38, wherein said at least one cover section includes an adhesive-free edge.

41. The film as claimed in claim 30, wherein said second partial film is segmented by at least one anti-tampering punchout.

42. A film lettered with a laser beam comprising:
a first partial film, said first partial film including at least one protective film which is transparent to said laser beam; at least one substantially metallic opaque layer having a first color and containing at least one hologram, said substantially metallic opaque layer being applied onto a bottom surface of said at least one protective film and being selectively ablated by said laser beam in areas where the metallic layer is irradiated by said laser beam, said at least one protective film sealing said substantially metallic opaque layer before, during and after ablation of said substantially metallic opaque layer; and a first adhesive layer applied to said at least one substantially metallic opaque layer and being resistant to laser radiation;
a second partial film applied to said first partial film, said second partial film including at least one contrast-forming layer having at least one color which is contrasting to said first color of said metallic opaque layer of said first partial film; and a second adhesive layer applied to said at least one contrast-forming layer on a side of said at least one contrast-forming layer facing away from said at least one substantially metallic opaque layer; and
wherein said first partial film and said second partial film are joined together by means of said first adhesive layer.

43. The film as claimed in claim 42, further comprising at least one cover section transparent to said laser beam attached to said at least one protective film with a removable adhesive.

44. The film as claimed in claim 43, wherein said at least one cover section includes an adhesive-free edge.

45. A film lettered with a laser beam comprising:
a first partial film, said first partial film including at least one protective film which is transparent to said laser beam; at least one substantially metallic opaque layer having a first color applied onto a bottom surface of said at least one protective film, said substantially metallic opaque layer being selectively ablated by said laser beam in areas where the layer is irradiated by said laser beam, said at least one protective film sealing said substantially metallic opaque layer before, during, and after ablation of said substantially metallic opaque layer; and a first adhesive layer applied to said at least one substantially metallic opaque layer and being resistant to laser radiation;

a second partial film applied to said first partial film, said second partial film including a least one contrast-forming layer having several areas of different colors which are contrasting to said first color of said metallic opaque layer of said first partial film, and a second adhesive layer applied to said at least one contrast-forming layer on a side of said at least one contrast-forming layer facing away from said at least one substantially metallic opaque layer; and wherein said first partial film and said second partial film are joined together by means of said first adhesive layer.

46. The film as claimed in claim 45, further comprising at least one cover section transparent to said laser beam attached to said at least one protective film with a removable adhesive.

47. The film as claimed in claim 46, wherein said at least one cover section includes an adhesive-free edge.

* * * * *